US010262132B2

(12) United States Patent
Reinecke et al.

(10) Patent No.: US 10,262,132 B2
(45) Date of Patent: Apr. 16, 2019

(54) MODEL-BASED COMPUTER ATTACK ANALYTICS ORCHESTRATION

(71) Applicant: Hewlett Packard Enterprise Development LP, Houston, TX (US)

(72) Inventors: Philipp Reinecke, Bristol (GB); Marco Casassa Mont, Bristol (GB); Yolanta Beresna, Bristol (GB)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 227 days.

(21) Appl. No.: 15/201,186

(22) Filed: Jul. 1, 2016

(65) Prior Publication Data
US 2018/0004941 A1   Jan. 4, 2018

(51) Int. Cl.
*G06F 11/00* (2006.01)
*G06F 21/55* (2013.01)
*G06F 16/903* (2019.01)
*G06F 21/56* (2013.01)
*H04L 29/06* (2006.01)
*G06F 17/30* (2006.01)
*G06F 21/57* (2013.01)
*G06N 5/02* (2006.01)
*G06F 12/14* (2006.01)

(52) U.S. Cl.
CPC ........ *G06F 21/55* (2013.01); *G06F 16/90335* (2019.01); *G06F 17/30979* (2013.01); *G06F 21/56* (2013.01); *G06F 21/566* (2013.01); *G06F 21/577* (2013.01); *G06N 5/02* (2013.01); *H04L 63/1408* (2013.01); *H04L 63/1416* (2013.01); *H04L 63/1425* (2013.01); *G06F 2221/034* (2013.01)

(58) Field of Classification Search
CPC ............. G06F 21/577; G06F 2221/034; G06F 17/30979; G06F 21/55; G06N 5/02
USPC .......................................................... 726/23
See application file for complete search history.

(56) References Cited

U.S. PATENT DOCUMENTS 9,378,361 B1 *   6/2016   Yen .......................... G06F 21/55
9,690,933 B1 *   6/2017   Singh ....................... G06F 21/56
9,773,112 B1 *   9/2017   Rathor ..................... G06F 21/56

(Continued)

FOREIGN PATENT DOCUMENTS

EP           3113061 A1     1/2017
WO     WO-2015128896         9/2015
WO     WO-2017086928 A1     5/2017

OTHER PUBLICATIONS

European Patent Office, Extended European Search Report for Appl. No. 17173825.5 dated Aug. 30, 2017 (8 pages).

*Primary Examiner* — Gary S Gracia

(57) ABSTRACT

Examples relate to model-based computer attack analytics orchestration. In one example, a computing device may: generate, using an attack model that specifies behavior of a particular attack on a computing system, a hypothesis for the particular attack, the hypothesis specifying, for a particular state of the particular attack, at least one attack action; identify, using the hypothesis, at least one analytics function for determining whether the at least one attack action specified by the hypothesis occurred on the computing system; provide an analytics device with instructions to execute the at least one analytics function on the computing system; receive analytics results from the analytics device; and update a state of the attack model based on the analytics results.

20 Claims, 5 Drawing Sheets

(56) References Cited

U.S. PATENT DOCUMENTS

| | | | |
|---|---|---|---|
| 2004/0249679 A1* | 12/2004 | Henderson | G06Q 40/08 705/4 |
| 2009/0307777 A1* | 12/2009 | He | G06F 21/55 726/25 |
| 2011/0185432 A1* | 7/2011 | Sandoval | G06F 21/554 726/25 |
| 2012/0054866 A1* | 3/2012 | Evans | H04L 63/1416 726/23 |
| 2012/0159622 A1* | 6/2012 | Lee | G06F 21/55 726/22 |
| 2014/0165207 A1* | 6/2014 | Engel | H04L 63/1425 726/25 |
| 2015/0033346 A1* | 1/2015 | Hebert | G06F 21/577 726/25 |
| 2015/0096036 A1* | 4/2015 | Beskrovny | G06F 21/577 726/25 |
| 2015/0326600 A1* | 11/2015 | Karabatis | H04L 63/1433 726/25 |
| 2016/0028750 A1* | 1/2016 | Di Pietro | H04L 63/1458 726/23 |
| 2016/0055335 A1 | 2/2016 | Herwono et al. | |
| 2016/0191559 A1* | 6/2016 | Mhatre | H04L 63/1416 726/23 |
| 2017/0223039 A1 | 8/2017 | Mont | |
| 2018/0139224 A1 | 5/2018 | Arnell | |

* cited by examiner

MODEL-BASED COMPUTER ATTACK ANALYTICS ORCHESTRATION

BACKGROUND

Computing systems of all types are frequently targeted by a variety of attacks from malicious entities. Computer attacks may be difficult to prevent, detect, and remediate, and several options exist for defending computing systems, such as firewalls, antivirus software, and network intrusion detection devices. Analytical devices and methods are also used to identify computer attacks at various stages, e.g., using symptoms or signatures of known attacks.

BRIEF DESCRIPTION OF THE DRAWINGS

The following detailed description references the drawings, wherein.

DETAILED DESCRIPTION

Figure 1:
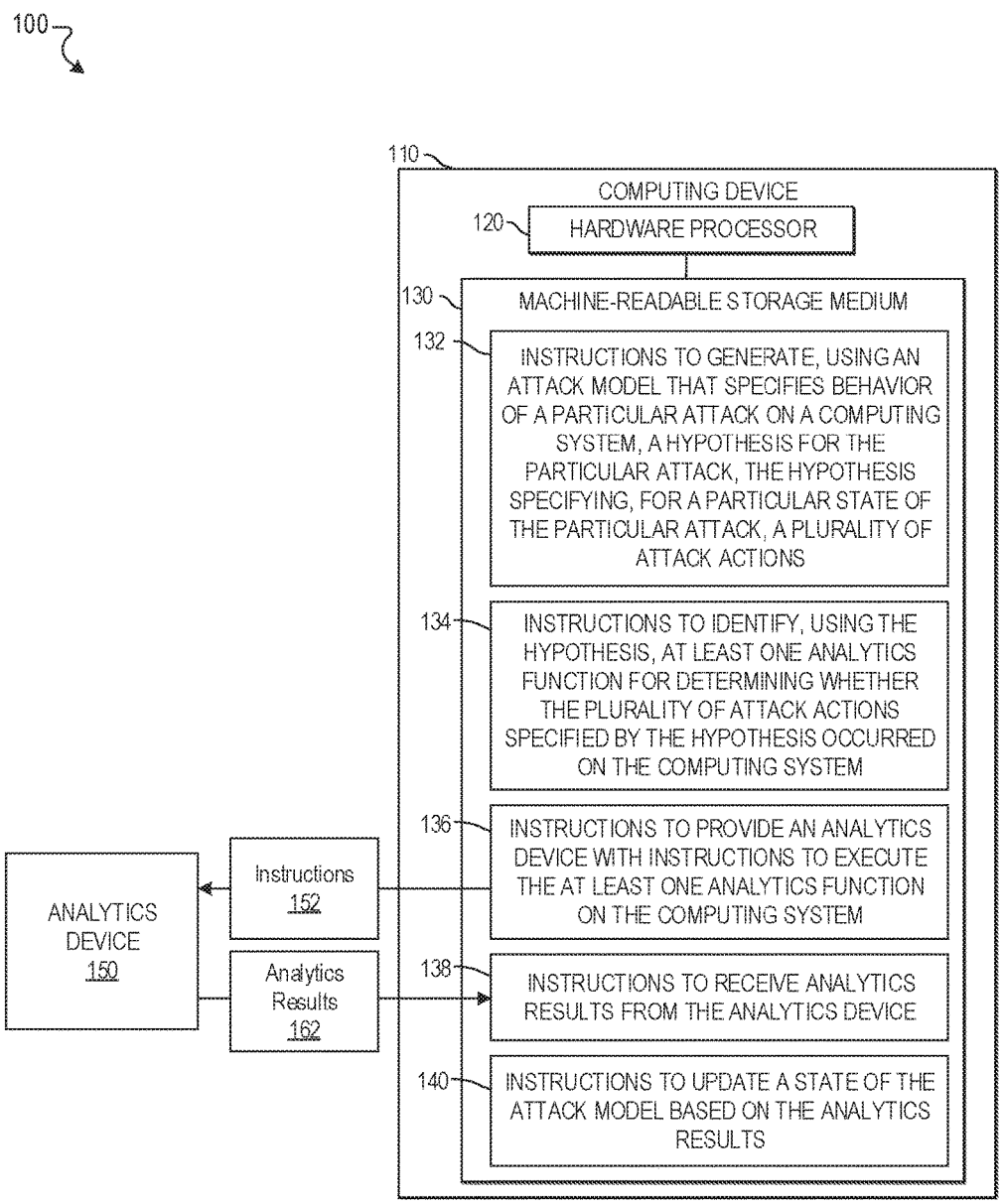
FIG. 1 is a block diagram of an example computing device for orchestrating analytics for model-based computer attacks.

Computer attack models may be used to drive detection, tracking, and prediction of malware and other malicious attacks on a computing system. The behavior of attacks on computer systems, whether a single computer or a large network of many computing devices, can be modeled at a high level. For example, the high level behavior of a data exfiltration attack—where an attack attempts an unauthorized export of some type of data from a computing system—can be modeled in a way that captures most data exfiltration attacks. E.g., such an attack may begin with an infection phase, followed by a discovery phase, then a lateral movement phase, and finally a data exfiltration phase. An attack model may include a variety of information that describes potential actions that could be taken in any given phase, or state, of an attack.

Attack models may be used to generate a hypothesis about the state of an attack on a computing system. In general, a hypothesis may be an instance of an attack model, where an assumption is made about the state of the computing system and/or attack actions that have taken place. The hypothesis, or attack model instance, may be generated in a variety of ways. For example, the hypothesis may be based on contextual information known about the computing system, queries to specific devices or databases containing information about the computing system, and particular model mechanisms, such as probabilistic and/or pseudo-random decisions regarding predicted attack actions. Using the aforementioned information, an actual hypothesis may specify predicted attack actions that have taken place.

To test the hypothesis, an analytics device may select particular analytics functions that are designed to determine whether particular actions are occurring or have previously occurred. For example, a hypothesis generated from a data exfiltration attack model may specify that a command and control channel was established within the computing system using a domain name generating algorithm to find a command and control server. One or more analytics functions that are designed to detect domain name generation algorithms may be used to determine whether one was used within the computing system. Other attack actions included in the hypothesis, such as the installation of a remote access Trojan (RAT) and ongoing command and control communication, may be associated with other analytics functions designed to determine whether those actions occurred or are actively occurring.

Analytics results may be used to update the state of an attack model, e.g., by updating the attack model instance used to form the hypothesis. For example, in situations where the analytics results indicate that the hypothesis correctly predicted that a RAT was installed and that a domain generation algorithm was used, lack of ongoing command and control communications may indicate that an attack was either already completed on the computer system or had advanced to a different phase, such as a lateral movement or data exfiltration phase. Updates to the attack model instance may then lead to a new hypothesis regarding the state of the attack on the computing system, which may again be tested using different analytics functions.

The attack models, as updated, may be used to predict the state of an attack on the computing system. Information regarding the state of a particular attack, including a prediction or confidence that the attack occurred, may be used in a variety of ways. In some implementations administrators and/or users of the computing system may be notified of a predicted attack based on the results of analytics performed during the attack modeling steps described above. In some implementations, remedial action(s) may be initiated in response to determining a particular attack occurred, or may have occurred, on the computing system. Further details regarding model-based computer attack analytics orchestration are provided in the paragraphs that follow.

Referring now to the drawings, FIG. 1 is a block diagram 100 of an example computing device 110 for orchestrating analytics for model-based computer attacks. Computing device 110 may be, for example, a personal computer, a server computer, mobile computing device, network device, or any other similar electronic device capable of modeling computer attacks. In the example implementation of FIG. 1, the computing device 110 includes a hardware processor, 120, and machine-readable storage medium, 130.

Hardware processor 120 may be one or more central processing units (CPUs), semiconductor-based microprocessors, and/or other hardware devices suitable for retrieval and execution of instructions stored in machine-readable storage medium, 130. Hardware processor 120 may fetch, decode, and execute instructions, such as 132-140, to control processes for computer attack modeling. As an alternative or in addition to retrieving and executing instructions, hardware processor 120 may include one or more electronic circuits that include electronic components for performing the functionality of one or more instructions, e.g., a Field Programmable Gate Array (FPGA) or Application Specific Integrated Circuit (ASIC).

A machine-readable storage medium, such as 130, may be any electronic, magnetic, optical, or other physical storage device that contains or stores executable instructions. Thus, machine-readable storage medium 130 may be, for example, Random Access Memory (RAM), non-volatile RAM (NVRAM), an Electrically Erasable Programmable Read-Only Memory (EEPROM), a storage device, an optical disc, and the like. In some implementations, storage medium 130 may be a non-transitory storage medium, where the term "non-transitory" does not encompass transitory propagating signals. As described in detail below, machine-readable storage medium 130 may be encoded with executable instructions: 132-140, for computer attack modeling.

Figure 2:
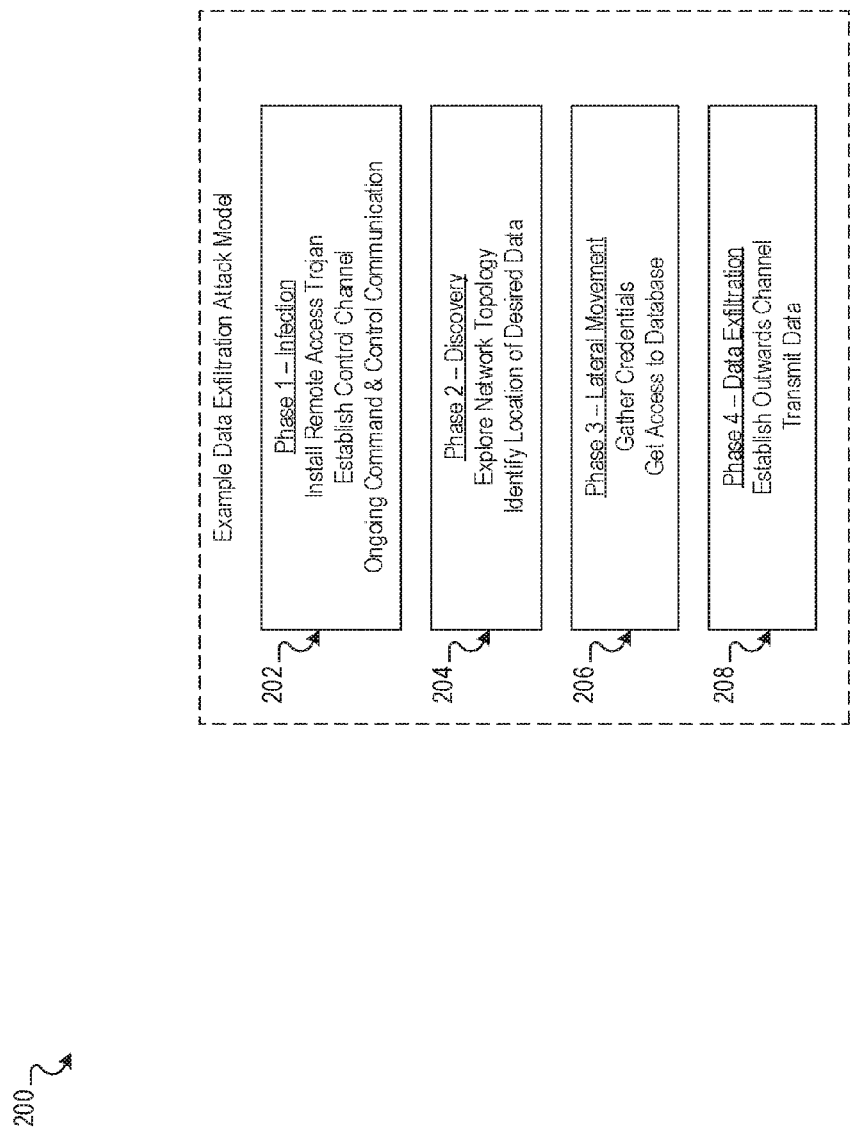
FIG. 2 is an illustration of an example attack model.

An illustration of an example attack model 200 is depicted in FIG. 2. The example attack model specifies, for each of four phases, attack actions that may occur during a data exfiltration attack, e.g., an attack designed to transfer data from a target computing system. Phase 1 202, the infection phase, specifies three actions that may occur when an attack tries to infect a computing system: i) install remote access Trojan (RAT), ii) establish a control channel, and iii) ongoing command and control communication. For example, during the infection phase, an attacker may first install a RAT on a device inside a network of computing devices. This may be achieved by convincing a user to download and execute an infected file from a website or e-mail. Next, the attack establishes a control channel for the RAT, which may be achieved by connecting to a remote command and control server. The RAT may use a domain generation algorithm to find a command and control server, or the RAT may download commands from a predetermined website.

Phase 2 204, the discovery phase, specifies two attack actions used to discover, within the infected computing system, a target for data exfiltration: i) explore network topology, and ii) identify location of desired data. For example, during this phase, the attacker may decide to explore the network topology of the computing system to identify the location of desired data. Exploration of the network topology may be performed by pinging reachable systems, port scanning, exploiting vulnerabilities, observing and mimicking user behaviors, etc. The location of the data can be identified by looking for shared resources in the network or by analyzing content stored by various host devices.

Phase 3 206, the lateral movement phase, specifies two attack actions used to gain access to a particular device, e.g., the device that stores data of interest: i) gather credentials, and ii) get access to database. For example, during the lateral movement phase, the attacker attempts to gain access to a machine that stores the desired data. This may be achieved by gathering valid user credentials or by exploiting a vulnerability in the target machine's software.

Phase 4 208, the data exfiltration phase, specifies two attack actions used to send the target data to a third party: i) establish outwards channel, and ii) transmit data. For example, during this phase, data exfiltration may be performed using DNS data exfiltration techniques, sending e-mail, uploading data to a remote machine via HTTP/HTTPS, or by storing the data on a cloud service.

Other data exfiltration attack models, aside from the example data exfiltration attack model 200, may be used for data exfiltration attacks. In addition, attack models may exist for many different types of attacks, such as DDOS attacks, attacks designed to destroy rather than export data, ransomware attacks, etc. The granularity of attack models may also differ across different attack models. The example attack model 200 is relatively high level, without specificity as to the exact attack actions used or the exact devices within the computing system that perform the attack actions. In some implementations, attack models may specify behavior for a particular type of device within a computing system, e.g., domain name generation algorithm usage on server client computing device.

In an example use of an attack model, as shown in FIG. 1, the hardware processor 120 executes instructions 132 to generate, using an attack model that specifies behavior of a particular attack on a computing system, a hypothesis for the particular attack, the hypothesis specifying, for a particular state of the particular attack, a plurality of attack actions. As noted above, the hypothesis may be considered an instance of the attack model, and it may represent a prediction regarding the current state of an attack on the computing system.

By way of example, the example attack model 200 could be implemented as a continuous time model, such as a Continuous-Time Markov-Modulated (CTMM) model. Other types of attack models, including stochastic/statistical models and/or predefined/static attack models, may also be used. The attack model 200 may be instantiated, e.g., by the computing device 110, and each phase of the attack model may be associated with a probability that indicates a measure of likelihood that an attack is in that phase. The probabilities may be affected by a variety of things, such as a default for the attack model and information regarding the state of the computing system.

Based on the attack model, the hypothesis may be generated as a sequence of attack actions that are predicted to have occurred. An example hypothesis generation algorithm is provided below:

```
function CTMM_HGA (M, t_S, t_E)
% Parameters
Let M = (α, Λ, P, t, S, D, μ) be a CTMM model, where
    α = (α_0, . . . , α_n), α_i ≥ 0, α1I = 1 is a stochastic vector,
    Λ = (λ_0, . . . , λ_n), λ_i ∈ R^+ is a vector of rates,
    P = (p)_{1≤i≤n,1≤j≤n}, p_ij ≥ 0, p_ii = 0, P1I = 1I is a stochastic matrix;
    t ∈ R, t ≥ 0 is the time of the model;
    S = {S_0, . . . , S_n} is a set of discrete probability distributions of
    symptoms;
    D is a set of device IDs, including the empty device IDε;
    μ ∈ R^+ is an interarrival rate;
    t_S, t_E ∈ R^+ are the start and end times, with t_M ≤ t_S ≤ t_E.
% Initialisation
Let H := ∅ be the event sequence.
Let k := DISCRETERANDOM(α) be the state of the model.
% Check whether the state is before an attack.
if k=0 then
    % Proceed to an attack step.
    k := DISCRETERANDOM((p_01, . . . , p_0n))
end if
% Operation
% Fast-forward time t to start time t_S.
while t < t_S do
    t := t + EXPONENTIALRANDOM(λ_k)
    k := DISCRETERANDOM((p_k1, . . . , p_kn))
end while
t := MIN(t, t_S)
% Generate sequence
while t < t_S do
    % Generate a sojourn-time t' for the current state.
    t' := EXPONENTIALRANDOM(λ_k)
    % Generate symptoms while in the current state.
    while t < t + t' do
        d := UNIFORMRANDOMCHOICE(D)
        s := DISCRETERANDOM(S_k)
        t" := EXPONENTIALRANDOM(μ)
        if t + t" ≥ t + t' then
            T := (t, t + t"]
            t := t + t"
        else
            T := (t, t + t']
            t := t + t'
        end if
        H := APPEND(H, (T, d, s))
    end while                        1
    % Change state
    k := DISCRETERANDOM((p_k1, . . . , p_kn))
end while
    return H
end function
```

The example function provided above is one way of generating a hypothesis that includes a plurality of attack actions using an attack model. Many other methods may be used. An example hypothesis generated for the example attack model 200 may include the following attack actions: sending e-mail to users of a computing system with a RAT attached, Installing the RAT on a computer, executing a domain generation algorithm (DGA), using randomly generated domains to establish communications with a command and control server, receiving instructions from the command and control server, pinging reachable systems to discover network topology, and port scanning devices within the computing system. In some implementations, at least some of the attack actions may be associated with a time stamp or time range associated with occurrence of the particular attack action. In some implementations, at least some of the attack actions may be associated with particular devices operating within the computing system, e.g., devices on which the attack action is predicted to have occurred.

The computing device 110 executes instructions 134 to identify, using the hypothesis, at least one analytics function for determining whether the plurality of attack actions specified by the hypothesis occurred on the computing system. Some or all of the attack actions may be detectable by one or more analytics functions, or operations, performed on the computing system. In some implementations, the computing device 110 may have access to a mapping of attack actions to analytics functions for detecting the corresponding action. For example, e-mail that contains an executable file may be detected by performing analytics on mail server data for known malicious binaries or executable e-mail detection, and use of a domain generation algorithm may be detected by network packet analytics that identifies randomly generated domains in DNS queries.

The computing device 110 executes instructions 136 to provide an analytics device 150 with instructions 152 to execute the at least one analytics function on the computing system. For example, the instructions 152 may indicate which analytics functions are to be run on which devices within the computing system. E.g., the instructions 152 may specify that an e-mail analytics function should be run on one or more e-mail servers within the computing system, while a DGA-detection function is to be run on routers within the computing system. In situations where the instructions 152 do not specify target devices for the analytics functions, the analytics device 150 may determine which devices will be targeted by which analytics functions.

In some situations, some analytics functions that are useful for evaluating the hypothesis may have already been executed on the computing system. For example, in situations where the computing system uses a network intrusion detection system (NIDS) to detect network attacks, the NIDS may already be performing analytics on network packets and may have already identified anomalies caused by abnormal port scans being performed within the computing system, the results of which may be stored by an analytics device and/or in a database. In this situation, instead of—or in addition to—causing an analytics device to execute analytics functions, the computing device 110 may execute instructions to identify, using the hypothesis, at least one analytics query for analytics results of the previously executed analytics function(s). In some implementations a mapping of particular attack actions to analytics queries may be used to identify the queries. In implementations where analytics queries are identified by the computing system 110, the analytics queries may be provided to the analytics device 150 or a separate analytics device/database.

The computing device 110 executes instructions 138 to receive analytics results 162 from the analytics device 150. Analytics results are provided whether the computing device 110 sent instructions 152 to the analytics device 150 or queries. A variety of information may be included in the analytics results 162, and the results 162 generally provide an indication of whether the attack actions specified by the hypothesis occurred and, in some implementations, which device(s) were affected by a particular attack. By way of example, analytics results 162 for e-mail analytics performed by the analytics device 150 may indicate that a known malicious binary was distributed to many users of the computing system as an e-mail attachment and/or that the malicious binary was downloaded on two computing devices within the computing system. In some implementations, analytics results 162 provide a binary indication of whether or not an attack action occurred, e.g., either the attack action occurred or it did not. In some implementations, analytics results 162 provide a measure of likelihood or probability that a given attack action occurred. For example, an analytics function designed to detect use of a domain generating algorithm (DGA) may provide analytics results 162 in the form of a probability that a DGA was used, e.g., 0.85. In some implementations, particular analytics results 162 may be inconclusive.

The analytics results 162 may be used to determine whether, and to what extent, the hypothesis was correct. For example, the computing device 110 may determine that the hypothesis was correct in situations where the analytics results 162 indicate each attack action included in the hypothesis was more likely to have occurred than not. Many other methods may be used to evaluate the success of the hypothesis, including thresholds for number of successfully predicted attack actions or aggregate likelihood of the predicted attack actions having occurred. In some implementations, individual attack actions of a hypothesis are determined to be correct, or not, rather than evaluating the hypothesis as a whole.

The computing device 110 executes instructions 140 to update a state of the attack model based on the analytics results 162. For example, the attack model instance that represents the current state of the computing system may be updated to reflect the analytics results 162. The extent to which the hypothesis was correct, or incorrect, may affect how the attack model instance is updated. Using the example attack model 200, in a situation where many phase 1 attack actions have been confirmed to have taken place, but phase 2 attack actions were not confirmed by the analytics results, the instantiated attack model may be more that phase 1 of the attack has already occurred, but that phase 2 of the attack has not yet taken place. In a situation where most or all of the attack actions in phase 1 and 2 were confirmed to have taken place, the computing device 110 may update the attack model to reflect that the likely state of the attack on the computing system is in phase 3 or 4.

Many additional steps may be performed by the computing device 110 or an associated device in response to the analytics results 162. For example, in situations where confidence in a particular attack is relatively high, an alert may be sent to a customer, system administrator, or attack remediation device or process. In addition, further analytics may be triggered. The computing device 110 may perform operations described above in an iterative fashion, e.g., in a manner designed to identify the current state of an attack with a relatively high measure of confidence. For example, after testing a hypothesis and finding that most phase 1 and 2 attack actions for the example attack model 200 occurred, the attack model instantiation may be updated and a new hypothesis regarding the attack may be generated, e.g., a hypothesis that predicts the particular attack is in phase 3 or 4. In some implementations, a new attack model may be chosen and instantiated based on the analytics results 162. For example, if few attack actions are confirmed, or confidence in occurrence of attack actions is relatively low, a new hypothesis for a new attack model may be generated and tested.

The execution of instructions 132-140 by the computing device 110 may be performed on demand, e.g., triggered by an analyst or external process, and/or performed randomly and/or periodically. The state of an instantiated attack model may be also be reported on demand or periodically, and the output may be used in a variety of ways, e.g., reporting, logging, remediating, visualizing, and/or alerting.

While computer attack modeling is described in FIG. 1 using a single example computing device 110 and a single example analytics device 150, the instructions 132-140 and variations may be executed in a variety of ways, including by use of a single device or multiple devices. For example, attack models may be managed by a separate device or devices, mappings of attack actions to analytics functions/queries may be managed by a separate device or devices, operations of the analytics device 150 may be performed by the computing device or multiple analytics devices, instructions 152 to perform analytics may be handled by an analytics device that is separate from an analytics device that handles analytics queries, and analytics results 162 may be evaluated by a separate device or devices. The computing device 110 may perform computer attack modeling from within the computing system under evaluation or from outside of the computing system.

Figure 3:
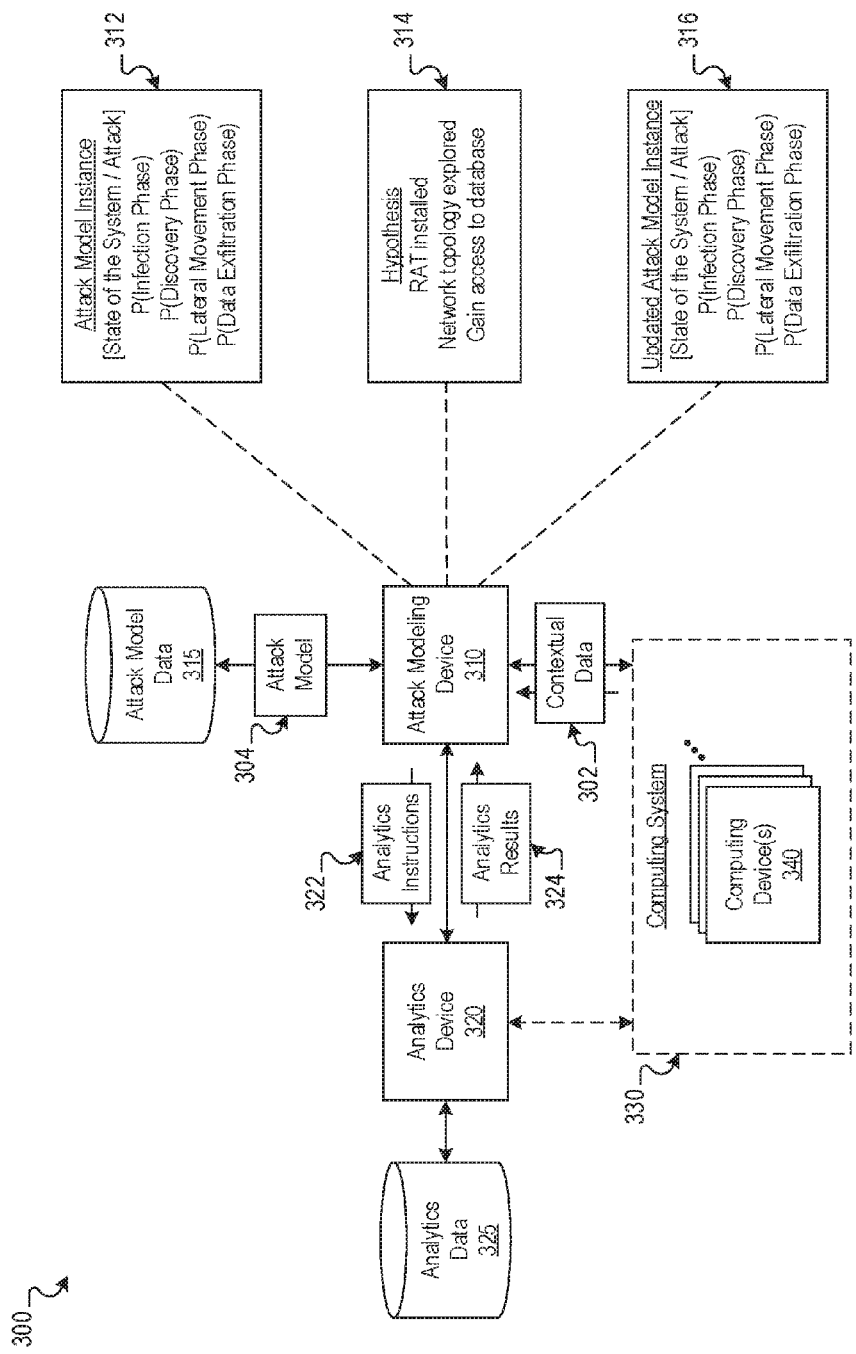
FIG. 3 is a data flow depicting orchestration of analytics for model-based computer attacks.

FIG. 3 is a data flow 300 depicting orchestration of analytics for model-based computer attacks using an attack modeling device 310. The attack modeling device 310 and analytics device 320 may be the same as or similar to the computing device 110 and analytics device 150 of FIG. 1. The example data flow 300 also depicts attack model data 315 and analytics data 325 storage devices, which may be similar to the computer readable storage medium 130 of FIG. 1. The computing system 330 for which attack modeling is performed is depicted as being separate from the attack modeling device 310 and analytics device 320; however, in some implementations one or both of the attack modeling device 310 and analytics device 320 may be included in the computing devices 340 that are part of the computing system 330.

The example data flow 300 begins with the attack modeling device 310 obtaining contextual data 302 from the computing system 330. The contextual data 302 may include a large variety of information about the computing system 330, including the identity and state of the computing devices 340 included in the system 330, the purpose(s) of the computing system 330, and the history of attacks on the computing system 330. The contextual data 302 may be used to determine which attack or attacks are likely to occur or may have already occurred. For example, software with known vulnerabilities may be running on the computing system 330, which makes the system 330 susceptible to certain types of computer attacks. As another example, the system 330 may—as part of its purpose—store valuable information such as financial or health related information, which may make the system 330 more likely to be targeted by a data exfiltration attack or crypto-virus attack. In addition, some analytics may have already been run or currently be running on the computing system 330, which may produce alerts related to potential attacks. For example, a NIDS device operating within the system 330 may perform analytics and produce an alert that indicates abnormal pings are taking place between computers within the system 330. In some implementations, identifiers, symptoms, and other information for devices within the computing system 330 that have previously been detected as being part of an attack may be included in the contextual data, e.g., detected using a previous hypothesis or other method.

The contextual data 302 may be used by the attack modeling device 310 to select an attack model 304 from the attack model data 315 storage device. Certain contextual information may lead to selection of certain attack models, or attack models may be chosen in other ways, e.g., pseudo-randomly, deterministically, and/or by user input. In some implementations, multiple attack models may be selected at once, allowing orchestration of multiple attack models. Using the example above, contextual information that indicates the computing system 330 stores valuable information may make selection of a data exfiltration attack model more likely.

The attack modeling device 310 instantiates the attack model 304. The depicted attack model instance 312 provides, for each of the four phases of a data exfiltration attack, a measure of likelihood—or probability—that an attack on the computing system is in that phase. In some implementations, additional information may be part of an instantiated attack model, such as identifiers of some of the computing devices 340 that are suspected to be involved in the attack. The attack model instance 312 also represents a hypothesis about the current state of the corresponding attack on the system.

In the example data flow 300, the attack modeling device 310 uses the attack model instance 312 to form a hypothesis 314 regarding attack actions that are predicted to have taken place. The hypothesis 314 may be generated by playing the selected attack model 304. For example, the attack model 304 may be provided, as input, a beginning and end time; the model may produce, as output, a sequence of attack actions that are predicted to have occurred over the period of time, e.g., as shown in the example hypothesis generation function provided above. The hypothesis 314 in the example data flow 300 shows three attack actions that are predicted to have taken place: RAT installed, network topology explored, and gain access to database. In some implementations a specific time or windows of time is/are included in the hypothesis 314 for some or all of the attack actions, e.g., indicating when the attack actions are predicted to have occurred. In some implementations, specific identifiers of computing devices may be included in the hypothesis 314, e.g., indicating specific computing devices 340 on which the particular attack actions are predicted to have occurred.

The hypothesis 314 is used to provide instructions 322 to the analytics device 320. In some implementations, the analytics instructions 322 include instructions to execute particular analytics functions that are designed to detect the attack actions specified by the hypothesis 314. For example, the analytics instructions 322 may identify three analytics functions to be performed to detect whether a RAT was installed, whether the network technology was explored, and whether an attacker gained access to a database. In some implementations, the analytics instructions 322 include instructions to execute analytics queries for analytics that have already been performed on the computing system 330. For example, analytics functions to determine whether the attack actions occurred may have already been performed, in which case the instructions 322 may query a database for the relevant results. Any combination of analytics instructions may be used, e.g., the instructions 322 may include some instructions for running analytics and some queries for results of previously executed analytics functions.

In some implementations, the analytics functions and/or queries may be identified by a separate analytics mapping device. While not depicted in the example data flow 300, an analytics mapping device may receive attack actions as input and, using a mapping of actions to analytics, provide analytics functions and/or queries as output. For example, an analytics mapping device may map the attack action "network topology explored" to several analytics functions, including an analytics function that analyzes pings within the computing system 330 and an analytics function that analyzes port scans within the computing system 330.

The analytics device 320 provides analytics results 324 to the attack modeling device 310. The analytics results 324 may be provided in a variety of ways. In general, the results 324 indicate whether each attack action was detected and which computing device(s) 340 the attack action(s) occurred on. By way of example, the analytics results 324 may indicate that a RAT was installed on two of the computing devices 340 and that both of those computing devices explored network topology, but that no database was accessed. In some implementations, a separate device may be used to analyze analytics results to determine whether attack actions were successfully identified.

Using the analytics results 324, the attack modeling device 310 updates the state of the attack model 304 by updating the attack model instance 312 to reflect what was provided in the results 324. In some implementations, the probabilities associated with at least one of the attack phases may be updated. For example, after analytics results 324 confirm that a RAT was installed, the attack modeling device may associate a probability of 0 with the infection phase of the attack, because the computing system 330 has already been infected. In the example situation, the probability that the attack is in the data exfiltration phase may be lowered, e.g., because analytics results 324 did not indicate that a database was accessed. However, the probability may not be set to 0, e.g., because the analytics used to determine whether the database was accessed may be inconclusive or incorrect, and/or another analytics function may be used to determine whether a database was accessed. In addition, the state of the attack model may be updated by indicating which device(s) are associated with various attack actions. For example, IP and/or MAC addresses of the devices on which a RAT was installed may be included in the updated attack model instance 316. This may facilitate further hypothesis generation and selection of new attack models.

In some implementations, a new hypothesis may be formed based on the updated attack model instance 316. In the example situation described above, a new hypothesis may assume that the two devices on which the RAT was installed are attempting to locate data to extract and/or access a database, and attack actions related to those goals may be included in the hypothesis. In addition, further discovery on previous attack actions may be initiated by including, in a new hypothesis, attack actions associated with ongoing command and control communications. Additional attack actions in a new hypothesis may facilitate identifying further attack actions that have occurred on affected devices as well as potentially discover other devices that are involved in the attack.

In some implementations, a new attack model may be selected from the attack model data 315. For example, in situations where the hypothesis didn't result in successful identification of a particular attack occurring, a new attack model for the same type of attack, or for a different type of attack, may be used to determine whether an attack is taking place or previously occurred on the computing system 330. Attack models may model attacks at different levels using mathematical formalisms, and they can be parameterized and adapted by both users and in an automated fashion. Because model instances may be continuously updated by the attack modeling device 310, evolving attacks may be detected by adjusting the analytics used for detection over time.

The attack modeling device 310 may take a variety of additional actions based on hypothesis results and the state of a given attack model instance. For example, certain types of attacks may cause certain actions to be taken in response. E.g., in response to confirming an attack, the attack modeling device 310 may notify a system administrator, deploy counter measures within the computing system 330, initiate additional analytics, and/or disable affected computing devices. In addition, while the example data flow 300 depicts orchestration of analytics for a single attack model, multiple attack models may be evaluated, e.g., in parallel, by one or more attack modeling devices.

Figure 4:
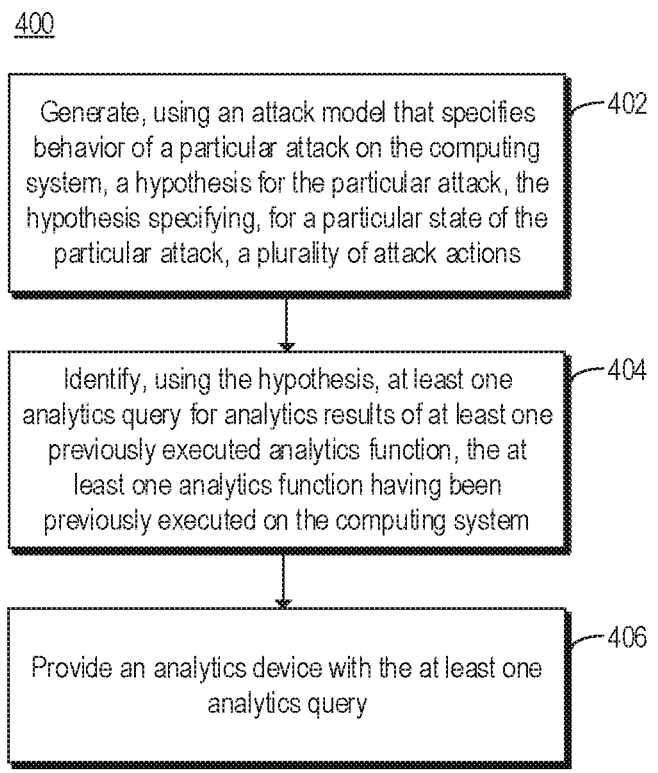
FIG. 4 is a flowchart of an example method for performing model-based computer attack analytics orchestration.

FIG. 4 is a flowchart of an example method 400 for performing model-based computer attack analytics orchestration. The method 400 may be performed by a computing device, such as a computing device described in FIG. 1. Other computing devices may also be used to execute method 400. Method 400 may be implemented in the form of executable instructions stored on a machine-readable storage medium, such as the storage medium 130, and/or in the form of electronic circuitry, such as a field-programmable gate array (FPGA) or application specific integrated circuit (ASIC).

Using an attack model that specifies behavior of a particular attack on the computing system, a hypothesis for the particular attack is generated, the hypothesis specifying, for a particular state of the particular attack, a plurality of attack actions (402). For example, a hypothesis may specify five different attack actions that may have taken place on at least one computer included in a computing system. Many different attack models may exist and, in some implementations, contextual data regarding the computer system may be used to select an attack model and/or generate the hypothesis.

Using the hypothesis, identify at least one analytics query for analytics results of at least one previously executed analytics function, the at least one previously executed analytics function having been previously executed on the computing system (404). For example, a mapping of attack actions to analytics queries may be used to identify one or more analytics queries, the results of which may be used to determine whether the attack action occurred. The mappings my have been created and maintained by a user and/or, in some implementations, automatically updated, e.g., using empirical results of prior analytics usage and rates of successful detection of particular attack actions.

An analytics device is provided with the at least one analytics query (406). For example, in a situation where an attack action is the use of a DGA, the analytics query may be issued for analytics that were previously performed on DNS queries issued by the computing system, e.g., because DGA use may be detected by identifying patterns in random names used in DNS queries.

In some implementations, analytics results received from the analytics device may be used to update the state of the attack model. For example, successfully detecting DGA use may result in updating an instance of the attack model to include the device(s) on which the DGA was used and to update the state of the attack, e.g., the state change may indicate that the devices have already been infected but may or may not have communicated with a command and control server.

Figure 5:
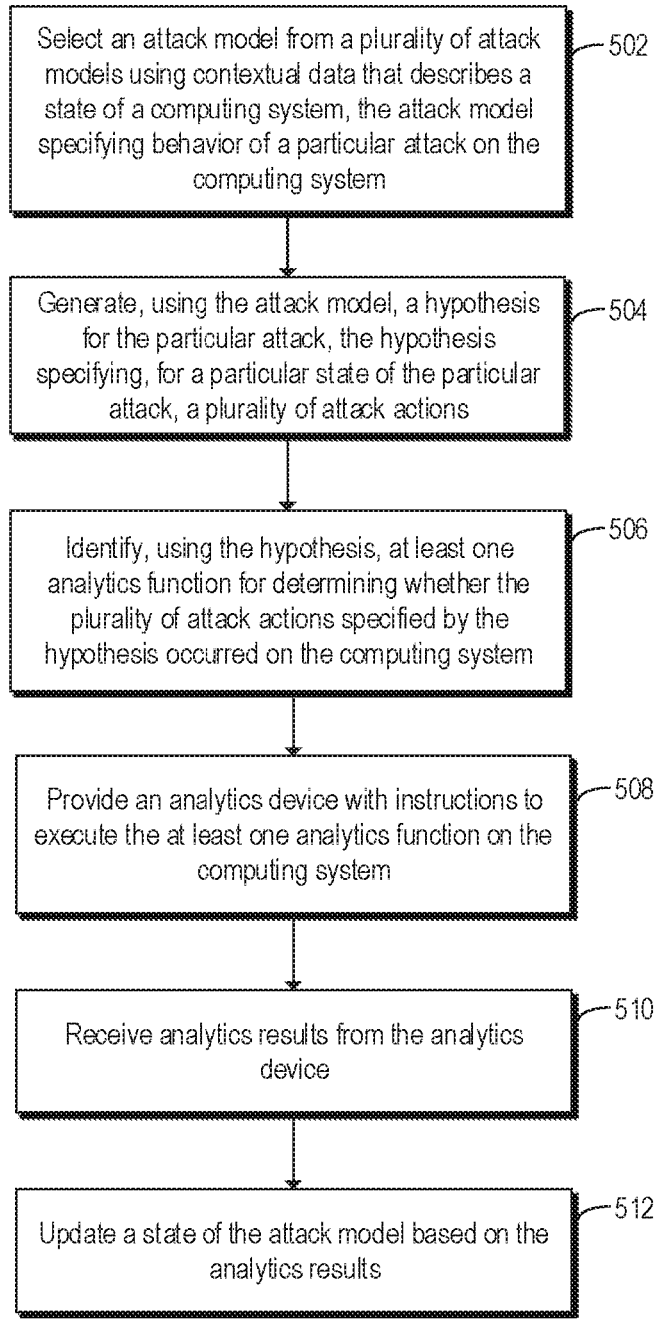
FIG. 5 is a flowchart of an example method for performing computer attack model updating during analytics orchestration.

FIG. 5 is a flowchart of an example method 500 for performing computer attack model updating during analytics orchestration. The method 500 may be performed by a computing device, such as a computing device described in FIG. 1. Other computing devices may also be used to execute method 500. Method 500 may be implemented in the form of executable instructions stored on a machine-readable storage medium, such as the storage medium 130, and/or in the form of electronic circuitry, such as a field-programmable gate array (FPGA) or application specific integrated circuit (ASIC).

An attack model is selected from a plurality of attack models using contextual data that describes a state of a computing system, the attack model specifying behavior of a particular attack on the computing system (502). For example, contextual data may indicate that a system might be susceptible to a crypto-virus attack, and a crypto-virus attack model may be identified from multiple attack models based on that contextual data. In implementations where multiple attack models are used at the same time, multiple crypto-virus attack models—or other types of attack models—may also be selected.

Using the attack model, a hypothesis is generated for the particular attack, the hypothesis specifying, for a particular state of the particular attack, a plurality of attack actions (504). For example, a hypothesis may be generated based on probabilities of various attack actions. An example hypothesis may provide that i) a computing system acquired a malicious file from a web page at a particular time, ii) the malicious file was executed by the acquiring device, and ii) command and control communication was established by communicating with a particular external computing device at another point in time.

Using the hypothesis, at least one analytics function is identified for determining whether the plurality of attack actions specified by the hypothesis occurred on the computing system (506). For example, an analytics mapping device may have access to a mapping of attack actions to analytics functions. The mappings may be 1:1, multiple:1, or 1:multiple. The identified analytics functions are generally useful for determining whether the corresponding attack action occurred on the computing device, e.g., as predicted by the hypothesis.

An analytics device is provided with instructions to execute the at least one analytics function on the computing system (508). For example, a separate analytics device may be used to actually perform analytics on various device(s) that is/are included in the computing system. In implementations where the instructions are for analytics queries for previous analytics results, a separate analytics device may also be used to process the queries.

Analytics results are received from the analytics device (510). Analytics results may include a variety of information, such as whether an attack action was successfully identified, when identified attack action(s) occurred, and on which device(s) the attack action(s) occurred.

The state of the attack model is updated based on the analytics results (512). For example, attack actions that were confirmed by the analytics results may be confirmed in the updated attack model state, identifiers of affected computing devices and timestamps for attack actions may also be included in the updated attack model state. In situations where the confirmed, or un-confirmed, attack actions indicate the attack model is in a different attack phase from the one predicted, the predicted attack model phase may also be updated.

In some implementations, confirmation of an attack may be determined based on the analytics results and/or state of the attack model. In this situation, particular attack actions, timestamps, and device identifiers may all be used to determine whether a particular attack occurred or is taking place. A measure of confidence in the predicted attack state may be used to determine what action or actions are taken in response to confirming that an attack has taken place or is taking place. For example, remedial actions may be initiated, notice may be sent to a third party, additional attack models may be played, and/or further analytics may be performed.

While the methods 400 and 500 are described with respect to a single computing device, various portions of the methods may be performed by other computing devices. For example, one computing device may be responsible for generating the hypothesis, another computing device may be responsible for mapping attack actions to analytics functions/queries, while another device may be responsible for processing analytics results.

The foregoing disclosure describes a number of example implementations for computer attack modeling. As detailed above, examples provide a mechanism for using computer attack models to facilitate securing a computing system.

We claim:

1. A computing device comprising:
a hardware processor; and
a data storage device storing instructions executable on the hardware processor to:
generate, using an attack model that specifies behavior of an attack on a computing system comprising one or more computing devices, a first hypothesis for the attack, the first hypothesis specifying, for a first phase of the attack, a first attack action;
identify, using the first hypothesis, an analytics instruction for determining whether the first attack action specified by the first hypothesis occurred on the computing system;
cause the analytics instruction to be executed on the computing system; update a state of the attack model to produce an updated attack model based on a result of execution of the analytics instruction indicating whether the first attack action occurred on the computing system;
generate, using the updated attack model, a second hypothesis for the attack, the second hypothesis specifying, for a second phase of the attack, a second attack action;
determine whether the second hypothesis is correct based on determining whether the second attack action occurred as determined using a different analytics instruction; and
in response to determining that the second attack action occurred, perform a counter-measure addressing the attack on the computing system, and notify one or more users of the computing system of the attack.

2. The computing device of claim 1, wherein the attack model specifies a plurality of phases, and for each respective phase of the plurality of phases, attack actions that may occur in the respective phase.

3. The computing device of claim 1, wherein the instructions are executable on the hardware processor to:

obtain contextual data describing a state of the computing system, and wherein the first hypothesis is further generated using the contextual data.

4. The computing device of claim 3, wherein the instructions are executable on the hardware processor to:
select, using the contextual data, the attack model from a plurality of attack models.

5. The computing device of claim 1, wherein the attack model is a continuous-time model.

6. The computing device of claim 1, wherein the analytics instruction comprises an analytics query to query the computing system to determine whether the first attack action occurred.

7. The computing device of claim 1, wherein the analytics instruction comprises an analytics function for execution on the computing system to determine whether the first attack action occurred.

8. The computing device of claim 1, wherein the countermeasure comprises disabling the computing system.

9. The computing device of claim 1, wherein each of the first hypothesis and second hypothesis represents a prediction of a current phase of the attack.

10. The computing device of claim 1, wherein the instructions are executable on the hardware processor to output likelihoods of the attack being in respective phases of a plurality of phases of the attack, the plurality of phases of the attack comprising the first and second phases.

11. The computing device of claim 1, wherein the updating of the state of the attack model is to reflect a likely phase of the attack.

12. A method performed by a device comprising a hardware processor, comprising:
generating, using an attack model that specifies behavior of an attack on a computing system comprising one or more computing devices, a first hypothesis for the attack, the first hypothesis specifying, for a first phase of the attack, a first plurality of attack actions;
identifying, using the first hypothesis, an analytics instruction for obtaining analytics results relating to occurrence of the first plurality of attack actions on the computing system;
updating a state of the attack model to produce an updated attack model based on the analytics results indicating whether the first plurality of attack actions occurred on the computing system;
generating, using the updated attack model, a second hypothesis for the attack, the second hypothesis specifying, for a second phase of the attack, a second plurality of attack actions;
determining whether the second hypothesis is correct based on determining whether the second plurality of attack actions occurred as determined using a different analytics instruction; and
in response to determining that the second plurality of attack actions occurred, performing a counter-measure addressing the attack on the computing system, and notifying one or more users of the computing system of the attack.

13. The method of claim 12, further comprising:
obtaining contextual data describing a state of the computing system; and
selecting, using the contextual data, the attack model from a plurality of attack models.

14. The method of claim 12, further comprising:
outputting likelihoods of the attack being in respective phases of a plurality of phases of the attack, the plurality of phases of the attack comprising the first and second phases.

15. The method of claim 12, wherein the updating of the state of the attack model is to reflect a likely phase of the attack.

16. A non-transitory machine-readable storage medium encoded with instructions that upon execution cause a computing device to:
select an attack model from a plurality of attack models using contextual data that describes a state of a computing system comprising one or more computing devices, the attack model specifying behavior of an attack on the computing system;
generate, using the attack model, a first hypothesis for the attack, the first hypothesis specifying, for a first phase of the attack, a first plurality of attack actions;
identify, using the first hypothesis, an analytics instruction for determining whether the first plurality of attack actions specified by the first hypothesis occurred on the computing system;
update a state of the attack model to produce an updated attack model based on analytics results obtained by the analytics instruction;
generate, using the updated attack model, a second hypothesis for the attack, the second hypothesis specifying, for a second phase of the attack, a second plurality of attack actions;
determine whether the second hypothesis is correct based on determining whether the second plurality of attack actions occurred as determined using a different analytics instruction; and
in response to determining that the second plurality of attack actions occurred, perform a counter-measure addressing the attack on the computing system, and notify one or more users of the computing system of the attack.

17. The non-transitory machine-readable storage medium of claim 16, wherein the attack model specifies a plurality of phases and, for each respective phase of the plurality of phases, attack actions that may occur in the respective phase.

18. The non-transitory machine-readable storage medium of claim 17, wherein the state of the attack model is updated by confirming that the first plurality of attack actions specified by the attack model occurred.

19. The non-transitory machine-readable storage medium of claim 16, wherein the analytics instruction comprises an analytics function for execution on the computing system or an analytics query to obtain information from the computing system.

20. The non-transitory machine-readable storage medium of claim 16, wherein each of the first hypothesis and second hypothesis represents a prediction of a current phase of the attack.

* * * * *